United States Patent
Campbell

(10) Patent No.: US 6,394,721 B1
(45) Date of Patent: May 28, 2002

(54) DUNNAGE BARS

(75) Inventor: Howard T. Campbell, Grand Blanc, MI (US)

(73) Assignee: Richfield Industries, Flint, MI (US)

( * ) Notice: Subject to any disclaimer, the term of this patent is extended or adjusted under 35 U.S.C. 154(b) by 0 days.

(21) Appl. No.: 09/723,179

(22) Filed: Nov. 27, 2000

(51) Int. Cl.[7] ................................................. B60P 7/15
(52) U.S. Cl. .......................... 410/143; 410/32; 410/43; 410/121
(58) Field of Search .......................... 410/143, 43, 121, 410/32, 34; 428/595, 586, 603; 248/225.11; 211/162, 41.1, 94.02

(56) References Cited

U.S. PATENT DOCUMENTS

| | | | |
|---|---|---|---|
| 4,238,550 A | * 12/1980 | Burgess et al. | 410/143 X |
| 5,037,256 A | * 8/1991 | Schroeder | 410/143 |
| 5,326,204 A | * 7/1994 | Carlson et al. | 410/143 |
| 5,378,093 A | * 1/1995 | Schroeder | 410/32 |
| 5,584,624 A | * 12/1996 | DeVoursney | 410/143 |
| 5,605,239 A | * 2/1997 | DeVoursney et al. | 410/143 X |
| 5,876,165 A | 3/1999 | Campbell | 410/43 |

\* cited by examiner

*Primary Examiner*—Stephen T. Gordon
(74) *Attorney, Agent, or Firm*—Reising, Ethington, Barnes, Kisselle, Learman & McCulloch, P.C.

(57) ABSTRACT

A tubular dunnage bar of rectangular cross-section has an inner wall, an outer wall and two side walls. The inner wall has a slot extending lengthwise of the dunnage bar. A channel extends lengthwise within the dunnage bar. The channel has a bottom wall spaced from and parallel to the inner and outer walls of the dunnage bar and side flanges secured to the side walls of the dunnage bar. The channel and the inner wall of the dunnage bar form a pocket. A dunnage strip is received in the pocket and has a nose projecting outwardly through the slot. The channel and the side walls and outer wall of the dunnage bar form a space. The bottom wall of the channel has a trough-shaped, strengthening portion displaced downwardly into the space. The trough-shaped portion of the bottom wall of the channel is arcuate in cross-section and is located midway between the side flanges of the channel. The space formed by the channel and the side walls and bottom wall of the dunnage bar is completely open and devoid of structure except for the trough-shaped portion of the bottom wall which projects downwardly into it.

1 Claim, 1 Drawing Sheet

DUNNAGE BARS

BACKGROUND AND SUMMARY OF THE INVENTION

Dunnage bars have many uses and may, for example, be used as part of a rack for transporting metal stampings such as automotive vehicle door panels, hoods and rear deck lids. An example of a rack for transporting metal stampings is own in prior U.S. Pat. No. 5,876,165 which is assigned to the assignee of this application.

Often a rack carrying metal stampings is shipped by train. When the train starts or stops suddenly, the dunnage bar may be subjected to severe impact. The dunnage bar must be strong enough to withstand the impact without twisting or bending.

The dunnage bar of the present invention is an elongated, tubular member having an inner wall, an outer wall and two side walls. Reinforcement of the dunnage bar is provided by an elongated channel extending lengthwise within the bar. The channel has a bottom wall spaced from and parallel to the inner and outer walls of the dunnage bar and side flanges secured to the side walls of the dunnage bar. The channel and the inner wall of the dunnage bar define a pocket for receiving a dunnage strip. The dunnage strip has a nose projecting outwardly through a slot in the inner wall of the dunnage bar. The dunnage strip is usually made of a suitable plastic or elastomeric material and its nose engages the metal stampings and holds them in place. The bottom wall of the channel has laterally spaced flat portions disposed in a common plane, separated by a strengthening, trough-shaped portion displaced downwardly from the common plane of the flat portions of the bottom wall. The special configuration of the bottom wall of the channel greatly increases the strength of the channel and hence of the dunnage bar, and increases it resistance to twisting and bending.

Preferably the trough-shaped portion of the bottom wall of the channel is concavo-convex in cross-section having a concave side facing upwardly and a convex side facing downwardly. In a preferred construction, the trough-shaped portion of the .channel is arcuate. Preferably also, the space defined by the channel and the side walls and bottom wall of the dunnage bar is completely open and devoid of structure except for the trough-shaped portion of the bottom wall which projects downwardly into One object of this invention is to provide a dunnage bar construction having the foregoing features and capabilities.

Another object is to provide a dunnage bar construction which is composed of a relatively few simple parts, is rugged and durable in use, and is capable of being inexpensively manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
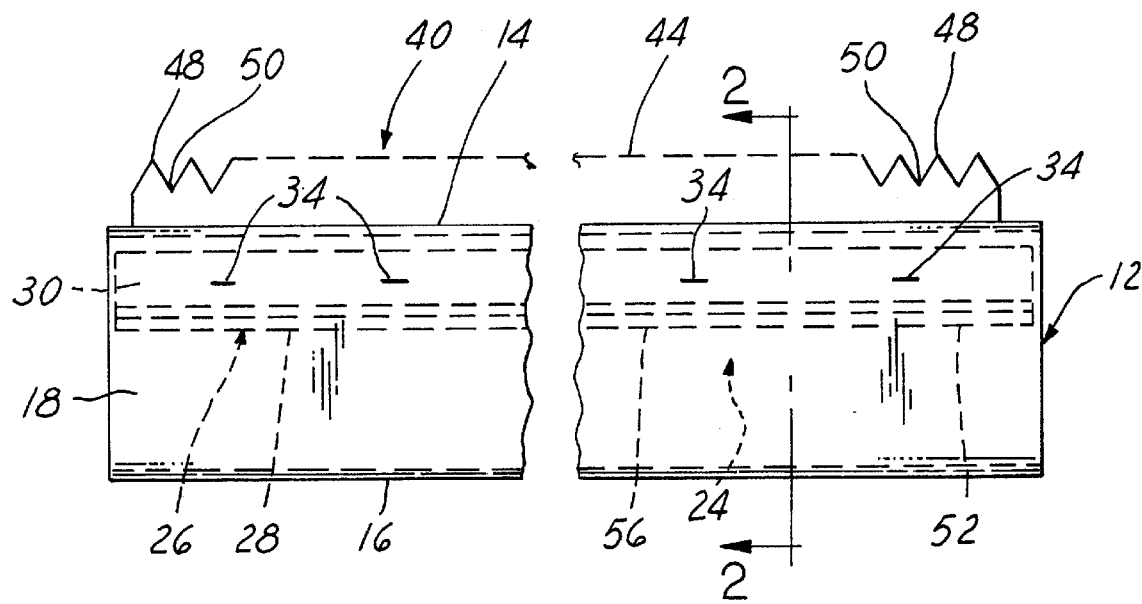
FIG. 1 is a side elevation, with parts broken away, of a dunnage bar constructed in accordance with this invention.
Figure 2:
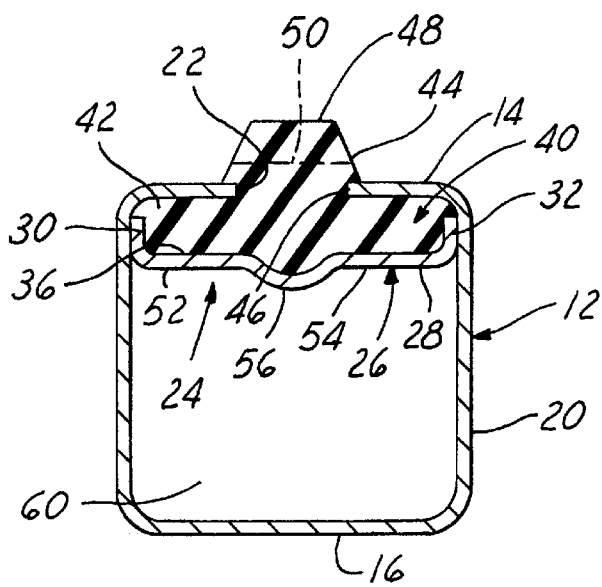
FIG. 2 is a sectional view taken on the line 2—2 in FIG. 1.

Referring now more particularly to the drawings, the dunnage bar construction comprises an elongated metal tubular dunnage bar 12 which is open at both ends and is of rectangular cross-section throughout its length. The dunnage bar 12 has an inner wall 14, an outer wall 16 and side walls 18 and 20. The inner wall 14 of the dunnage bar 12 has an elongated slot 22 extending lengthwise of the dunnage bar from one end of the dunnage bar to the other, and open at both ends. The slot runs down the middle of the inner wall 14.

A reinforcement 24 is provided within the dunnage bar 12. The reinforcement 24 comprises an elongated metal channel 26 which extends lengthwise within the dunnage bar for substantially the full length of the dunnage bar. The channel has a bottom wall 28 which is spaced from and generally parallel to the inner and outer walls 14 and 16 of the dunnage bar 12. The channel has side flanges 30 and 32 which extend toward the inner wall 14 of the dunnage bar. The side flanges 30 and 32 of the channel are parallel to the side walls 18 and 20 of the dunnage bar and are secured thereto preferably by welding. Spot welds 34 are shown at about eight inch intervals securing the side flanges 30, 32 of the channel to the side walls 18, 20 of the dunnage bar.

The channel 26 and the inner wall 14 of the dunnage bar define a pocket 36 for a dunnage strip 40. The dunnage strip is preferably made of a flexible rubber or suitable elastomeric material and has an elongated body portion 42 which fits within the pocket, and a nose portion 44 which projects outwardly from the pocket through the slot 22 in the inner wall 14 of the dunnage bar 12. The length of the dunnage strip 40 approximates the length of the dunnage bar 12. The dunnage strip has elongated grooves 46 along its full length between the body portion and nose portion thereof receiving the edges of the inner wall 14 on opposite sides of the slot 22 to anchor the dunnage strip therein. Preferably the nose of the dunnage strip has alternate ribs 48 and grooves 50 along its length, the grooves 50 being adapted to receive edges of metal stampings supported by a rack for transporting the metal stampings. The dunnage strip 40 is capable of being installed in the pocket 36 and removed therefrom by sliding into and out of either end of the dunnage bar 12.

The bottom wall 28 of the channel has elongated laterally spaced flat portions 52 and 54 separated by an elongated, trough-shaped portion 56 displaced downwardly from the common plane of the flat portions into a space 60 defined by the bottom wall of the channel and the side walls 18 and 20 and outer wall 16 of the dunnage bar. The portions 52, 54 and 56 of the channel extend for the full length of the channel.

The trough-shaped portion 56 of the bottom wall of the channel, in cross-section, is concavo-convex throughout its length, having a concave side facing upwardly and a convex side facing downwardly. Preferably as shown, the trough-shaped portion 56 is arcuate in shape throughout its length and located midway between the side flanges of the channel. The space 60 is completely open and devoid of structure except for the trough-shaped portion 56 of the bottom wall of the channel which projects downwardly into the space.

In prior constructions, the space beneath the channel 26 has been occupied by a separate reinforcing member, but in the present construction, the separate reinforcement member is unnecessary and therefore omitted because of the unique configuration of the bottom wall of the channel. The trough-shaped portion 56 of the channel adds strength to the channel and hence to the dunnage bar and increases the resistance of the dunnage bar to twisting or bending. The increased strength of the channel makes it possible to reduce the wall thickness of the dunnage bar 12 which in the present instance is preferably about 0.075 inches. Preferably the dunnage bar 12 preferably is made of 120×f steel.

What is claimed is:

1. A dunnage bar construction comprising;

an elongated tubular bar of rectangular cross-section having an inner wall, an outer wall and two side walls, said inner wall having an elongated slot extending lengthwise of said bar, a reinforcement for said bar, said reinforcement comprising an elongated channel extending lengthwise within said bar from one end of said bar to the other, said channel having a bottom wall spaced from and parallel to said inner and outer walls of said bar and side flanges secured to the respective side walls of said bar, the side walls of said channel having upper edges terminating adjacent to the inner wall of said bar, said channel and said inner wall defining a pocket, a dunnage strip received in said pocket having a nose portion projecting outwardly through said slot, the bottom wall of said channel and the side walls and outer wall of said bar defining a single space, said bottom wall of said channel having elongated laterally spaced flat portions disposed in a common plane parallel to said outer wall of said bar, said flat portions being separated by an elongated, trough-shaped, strengthening portion displaced downwardly from said flat portions toward said outer wall of said bar, the flat portions of said bottom wall of said channel being spaced from said outer wall by a predetermined distance, the strengthening portion of said bottom wall of said channel being displaced downwardly from said flat portions by an amount which is only a minor portion of said predetermined distance, said flat portions and said strengthening trough-shaped portion extending the full length of said bottom wall.

* * * * *